United States Patent

[11] 3,633,929

| [72] | Inventors | London T. Morawski;<br>John J. Parker, both of 11487 East Nine Mile Road, Warren, Mich. |
|---|---|---|
| [21] | Appl. No. | 877,203 |
| [22] | Filed | Nov. 17, 1969 |
| [45] | Patented | Jan. 11, 1972 |

[54] MULTIJAW DRAWBAR-TYPE CHUCK
6 Claims, 10 Drawing Figs.

[52] U.S. Cl. ................................................ 279/1 J,
279/2, 279/60
[51] Int. Cl. ..................................................... B23b 31/12
[50] Field of Search ............................................ 279/60, 65,
1 J, 1 L, 1 R, 123, 2; 77/18; 269/138

[56] References Cited
UNITED STATES PATENTS

| 2,025,885 | 12/1935 | Nenninger et al. | 279/60 UX |
| 2,109,828 | 3/1938 | Owen | 279/123 |
| 2,404,006 | 7/1946 | Thomas | 279/60 |
| 3,104,886 | 9/1963 | Hohwart et al. | 279/123 X |
| 3,248,122 | 4/1966 | Roddy | 279/60 X |

*Primary Examiner*—Andrew R. Juhasz
*Assistant Examiner*—James F. Coan
*Attorney*—Barnes, Kisselle, Raisch & Choate

ABSTRACT: A chuck especially adapted for holding castings and forgings having a plurality of jaws mounted on the outer ends of jaw carrier rods inclined to the axis of the chuck. The jaw carrier rods are connected at their inner ends to a drawbar in a manner to permit the carrier rods and the jaws mounted thereon to rotate slightly to compensate for dimensional variations and surface irregularities.

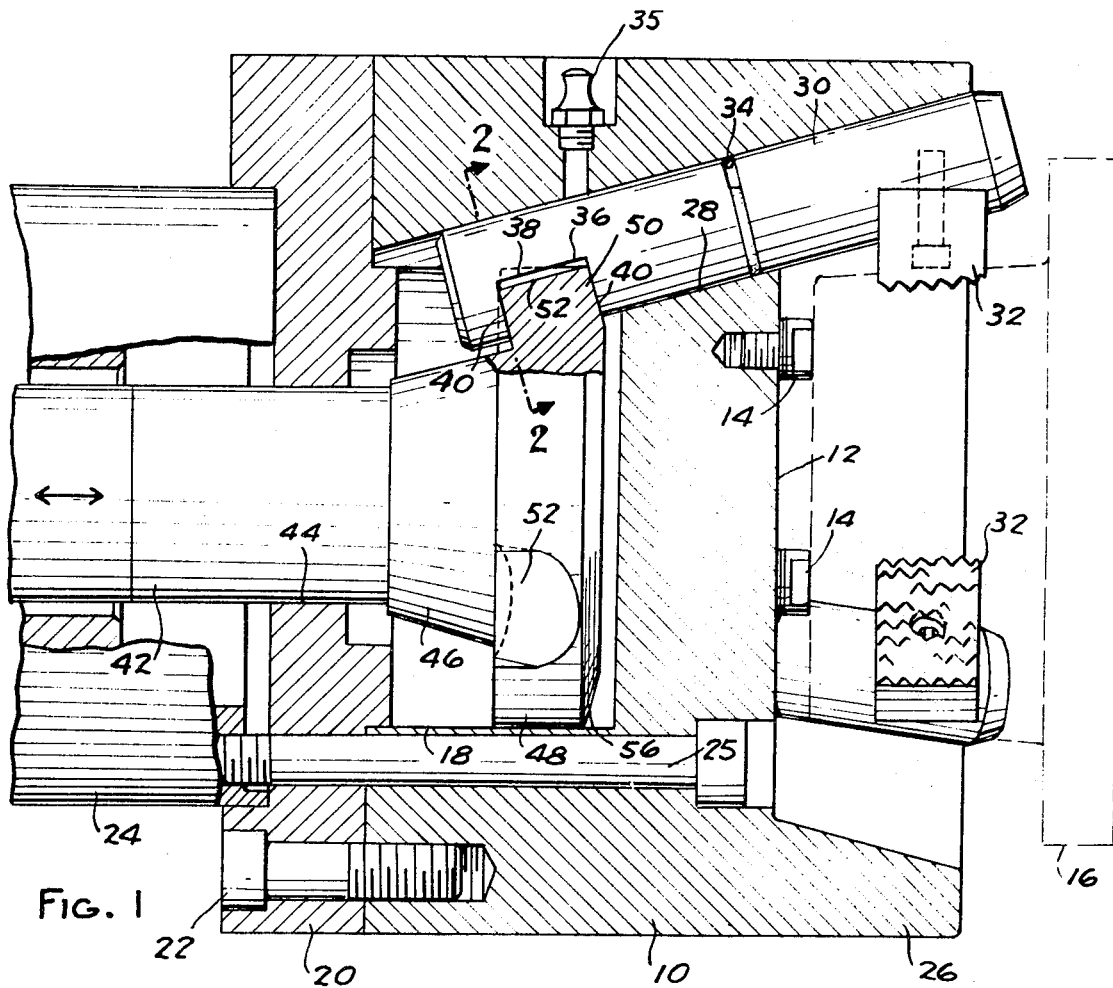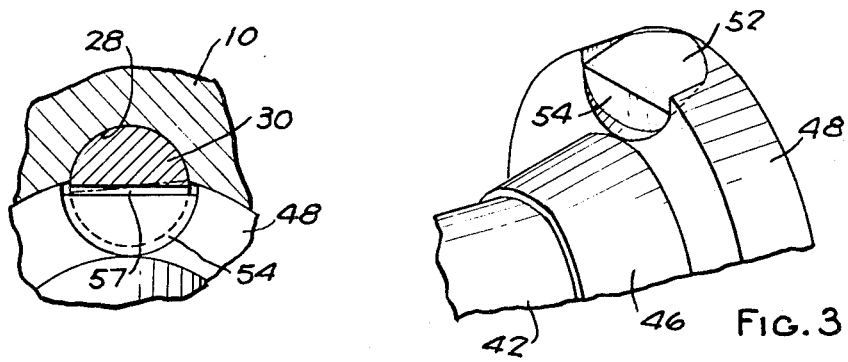

INVENTORS
LONDON T. MORAWSKI
JOHN J. PARKER
BY
*Barnes, Kisselle, Raisch & Choate*
ATTORNEYS INVENTORS
LONDON T. MORAWSKI
JOHN J. PARKER
BY
Barnes, Kisselle, Raisch & Choate
ATTORNEYS

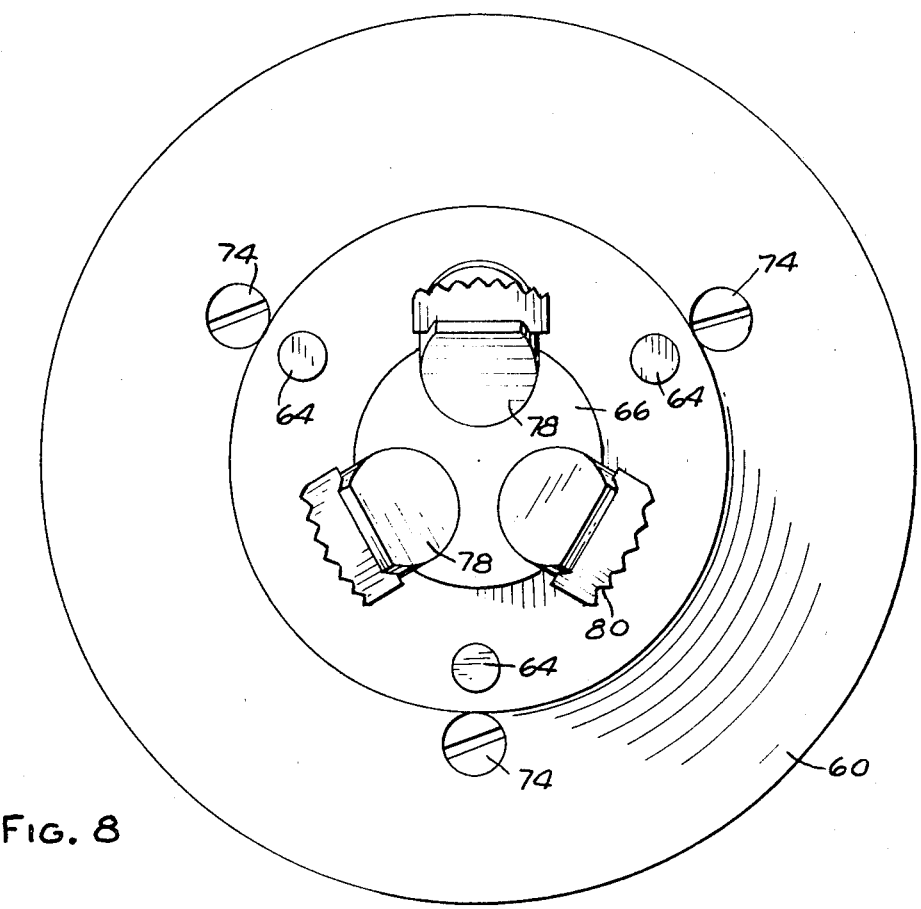
FIG. 8
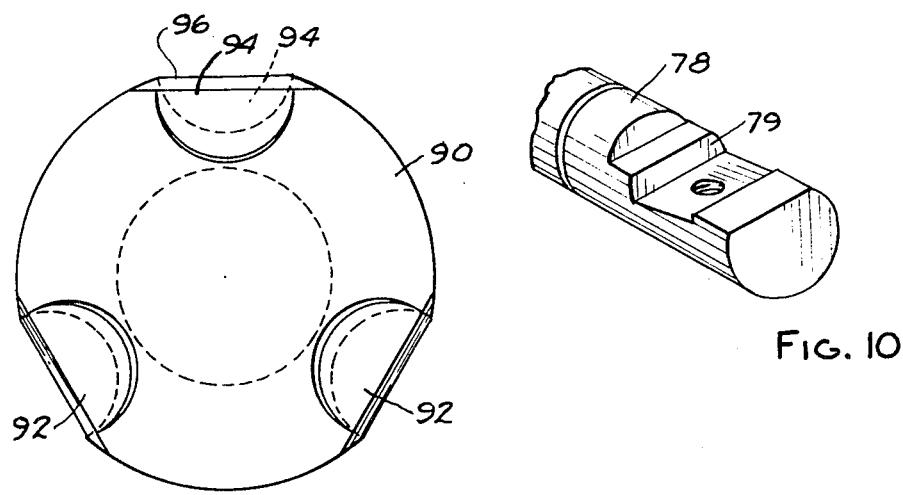
FIG. 9
FIG. 10
INVENTORS
LONDON T. MORAWSKI
JOHN J. PARKER
BY
Barnes, Kisselle, Raisch & Choate
ATTORNEYS

MULTIJAW DRAWBAR-TYPE CHUCK

This invention relates to chucks and more particularly to multijaw chucks of the drawbar type especially adapted for holding castings and forgings.

Because of the manner in which production castings and forgings are made it frequently happens that surface irregularities are produced and dimensional variations occur from piece to piece.

The primary object of this invention is to provide a chuck admirably suited for rigidly holding casting and forgings even though the workpieces may contain surface irregularities and may vary dimensionally from piece to piece.

A further object of the invention is to provide a chuck of the type described which is of compact size, has relatively few parts and which at the same time is of very rigid construction.

Other features and objects of the invention will become apparent from the accompany description and drawings, in which:

FIG. 1 is a sectional view of a chuck according to the present invention adapted for gripping a workpiece around the outer periphery thereof;

FIG. 2 is a sectional view along the line 2—2 in Fig. 1;

FIG. 3 is a fragmentary perspective view of a portion of the drawbar;

FIG. 8 is a front elevational view of the chuck shown in Fig. 6;

FIG. 9 is a front elevational view of the drawbar illustrated in Fig. 6;

FIG. 10 is a fragmentary perspective view of one of the jaw carrier rods.

Figure 4:
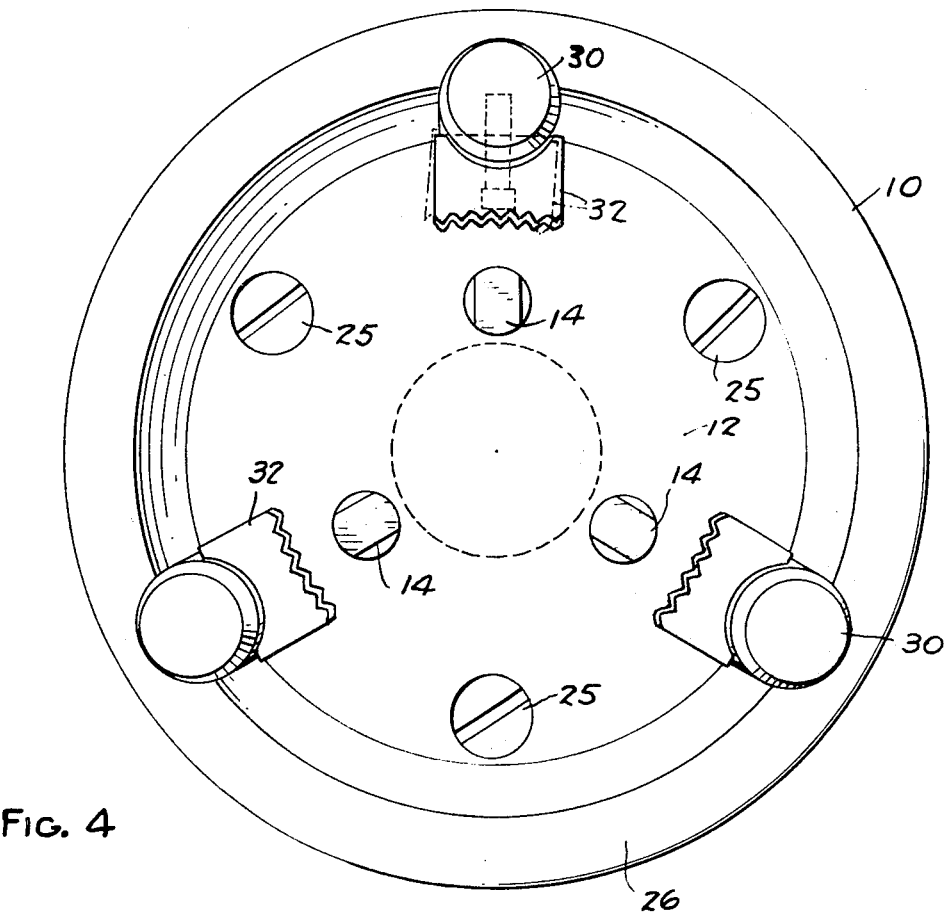
FIG. 4 is a front elevational view of the chuck shown in Fig. 1.

Referring to FIG. 1, the chuck disclosed therein includes a body 10 having a front face 12 into which are threaded a plurality of stop buttons 14. Stop buttons 14 are adapted to be abutted by the face of a workpiece 16 for locating the workpiece axially on the chuck. Chuck body 10 is formed with a central bore 18 which extends forwardly from the rear face of the chuck. A rear plate 20 is secured to body 10 by screws 22. Body 10 is mounted on a spindle 24 of a machine tool such as a lathe by screws 25.

In the embodiment illustrated in FIG. 1 body 10 includes an integral annular extension 26 which projects forwardly from front face 12 and which extends around the outer periphery of body 10. A plurality of three circular cylindrical bores 28 are formed in body 10. As shown, bores 28 extend through extension 26 through body 10 and communicate at their rear ends with bore 18. Each bore 28 inclines radially inwardly in a rearward direction. Within each bore 28 there is slideably arranged a jaw carrier rod 30 of circular cross section. Each rod 30 has a serrated jaw 32 mounted on the radially inner side of the jaw adjacent its forward end. An O-ring 34 on each rod 30 forms a seal between the rod and bore 28 for lubricant introduced through fittings 35. Adjacent its rear end each rod 30 is formed with a radial notch 36. Notch 36 extends radially outwardly from the radially inner side of each rod 30 and terminates in a flat axially extending face 38. The axially spaced apart side faces 40 of each notch 36 are flat and perpendicular to the longitudinal axis of rod 30.

A drawbar 42 is associated with the chuck. Drawbar 42 is adapted to be actuated in an axial direction by suitable means on the machine tool not illustrated. Drawbar 42 extends through a central opening 44 in rear plate 20 and at its forward end has an enlarged head 46. Head 46 is fashioned with a circular flange 48 slideably arranged in bore 18. At three equally circumferentially spaced portions thereof which correspond with the circumferential spacing of rods 30 flange 48 has lugs 50 machined thereon. Each lug 50 has a radially outer face 52 which is parallel to the longitudinal axis of its associated rod 30. Each lug 50 is also formed with a rear face 54 which extends perpendicular to the axis of the associated rod 30. The front face of each lug 50 is defined by a flat on the conical front face 56 of flange 48. Faces 54 and 56 are spaced apart to have a close sliding fit with the faces 40 of notches 36. However, the radially outer face 52 of each lug is so positioned that it is normally spaced radially inwardly of the radially outer face 38 of each notch 36. Thus, each notch 36 is generally of semicylindrical shape and each lug 50 is likewise of generally semicylindrical shape, a radial clearance 57 being provided between each lug and its associated notch.

In order to enlarge the diameter of the circle formed by jaws 32 and thereby permit insertion of a workpiece 16 between the jaws, drawbar 42 is shifted axially to the right as viewed in FIG. 1. Such movement of the drawbar is translated into a movement of the jaws 32 axially forwardly and radially outwardly by reason of the interconnection of notches 36 with lugs 50. With the jaws in the expanded position a workpiece 16 may be inserted within the circle defined by the jaws. Thereafter drawbar 42 is retracted; that is, shifted axially toward the left as viewed in FIG. 1, to firmly clamp the workpiece between jaws 32 and draw it against stops 14. In view of the slight radial clearance 57 between each lug 50 and its associated notch 36 and further in view of the fact that lugs 50 are inclined perpendicular to the axes of rods 30, it follows that each rod 30 is permitted to rotate slightly if necessary so that jaws 32 can accommodate for any slight irregularities on the surface of the workpiece 16. Thus, even though there may be slight dimensional variations or surface irregularities in the castings or forgings engaged by the jaws of the chuck, the ability of rods 30 to rotate slightly enables the chuck to compensate for such irregularities and variations. Furthermore, it will be noted that while the inclined disposition of rods 30 enables jaws 32 to grip the workpiece with a relatively large force, nevertheless rods 30 are amply supported in a radial direction by reason of the circumferentially continuous annular extension 26 at the front face of the chuck.

It will be noted that the chuck construction shown in FIG. 1 employs a minimum of separate parts. The chuck is of relatively heavy construction for its size and will require a minimum of maintenance.

Figure 5:
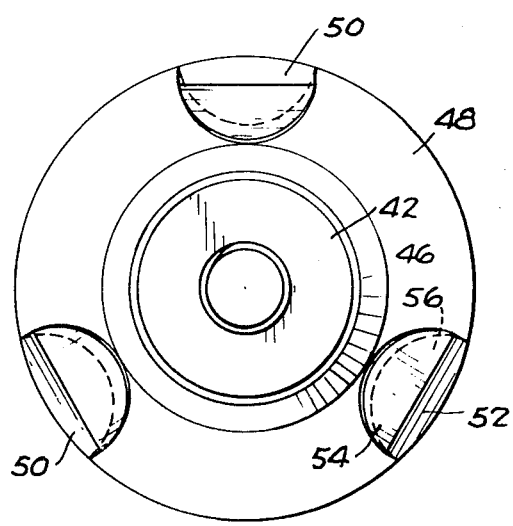
FIG. 5 is a rear elevational view of the drawbar.
Figure 6:
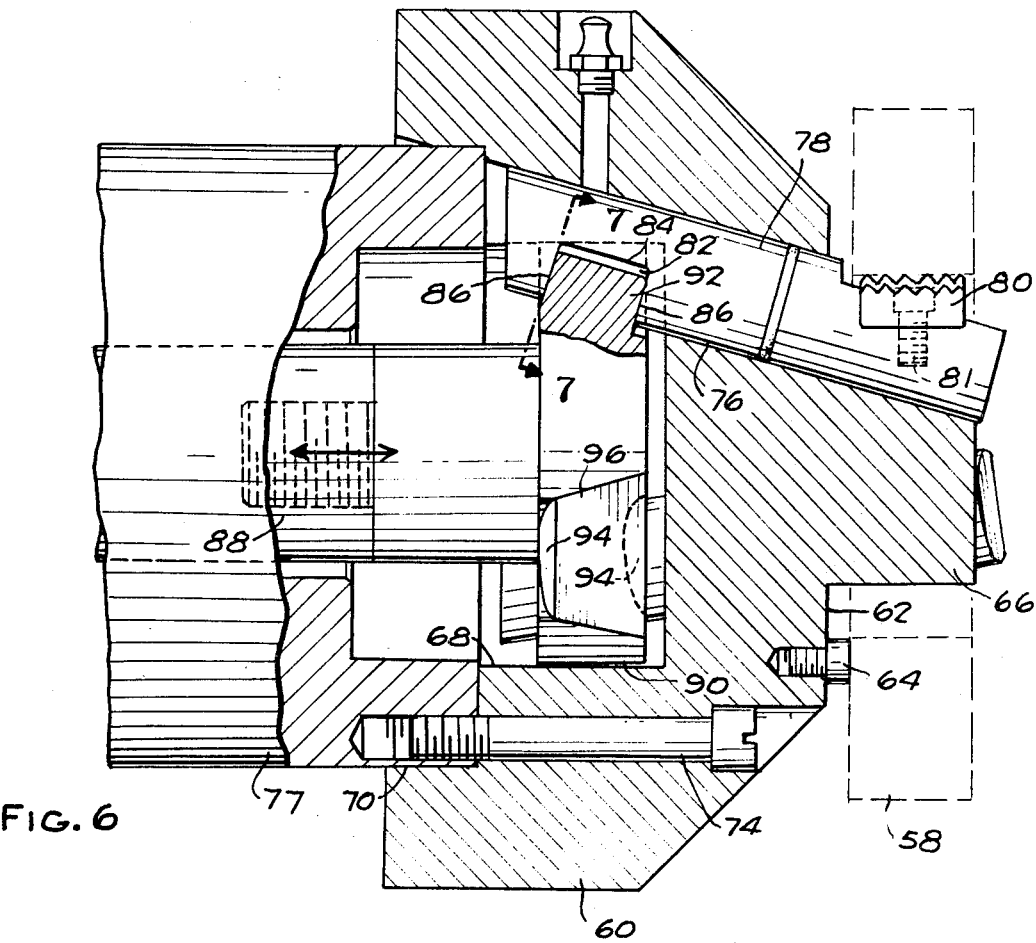
FIG. 6 is a sectional view of a chuck according to the present invention adapted for gripping a workpiece around the inner periphery thereof.
Figure 7:
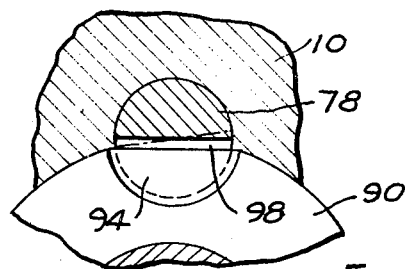
FIG. 7 is a sectional view along the line 7—7 in Fig. 6.

The chuck illustrated in FIGS. 6 through 10 involves the same features as that shown in FIGS. 1 through 5 but differs from the previous embodiment in that it is adapted for gripping a workpiece 58 around the innner periphery thereof. The chuck includes a body 60 having a front face 62 on which are located stop buttons 64 for axially locating the workpiece on the chuck. Body 60 is formed with a central forward extension 66 of substantially smaller diameter than body 60. Body 60 is formed with a large central bore 68 extending rearwardly to the rear face of the chuck and communicating with a counterbore 70. Counterbore 70 is employed for centering the chuck on the forward end of a machine tool spindle 72. Screws 74 are used for securing the chuck on spindle 72.

Body 60 is formed with three bores 76 which are spaced apart circumferentially equal distances. Bores 76 are of circular cross section and have their axes extending radially inwardly in a forward direction. At their front ends bores 76 extend partially in extension 66. The rear end of each bore 76 communicates with the large central bore 68 in body 60. Within each bore 76 there is arranged a jaw carrier rod 78. Each rod 78 is a circular cross section and has a radially outwardly facing jaw 80 rigidly mounted thereon adjacent the forward end of the rod. As shown in FIG. 10, the forward end of each rod 78 is formed with a recessed seat 79 to accommodate jaw 80 which is held in place by a screw 81. Each jaw 80 lies in the radial plane of extension 66 so that the jaws are radially backed by extension 66. At its rear end portion each jaw is formed with a notch 82. Each notch 82 has a radial end face 84 lying in a flat plane at the axis of the rod. The two side faces 86 of each notch 82 are spaced apart axially and extend perpendicular to the axis of the rod.

A drawbar 88 is arranged for axial sliding movement within spindle 72. At its front end drawbar 88 is formed with a circular cylindrical flange 90 having a close sliding fit with bore 68. Flange 90 is formed with three lugs 92. Lugs 92 are spaced apart circumferentially equal distances to correspond and interengage with notches 82. The front and rear faces 94 of each lug 92 are spaced apart to have a close sliding fit with the side faces 86 of notches 82. The radially outer flat faces 96 of each lug 92 are formed as flats around the outer periphery of flange 90. Each of the faces 96 extends in a plane parallel to and spaced from the inner face 84 of a notch 82. Thus, a radially extending clearance space 98 is provided between each lug 92 and its associated notch 82. As in the previous embodiment illustrated, the clearance spaces 98 permit limited rotation of rods 78 and the jaws 80 mounted thereon so as to accommodate for slight dimensional variations and surface irregularities on the workpiece 58 being gripped by the jaws.

The operation of the chuck illustrated in FIGS. 6 through 9 is substantially the same as that previously described in connection with the chuck illustrated in FIGS. 1 through 5. However in the chuck illustrated in FIGS. 6 through 9 the jaws are collapsed by shifting drawbar 88 forwardly; that is, in the direction toward the right in FIG. 6, and are expanded into engagement with the inner diameter of the workpiece by retracting the drawbar. When the drawbar is retracted, jaws 80 shift axially inwardly and radially outwardly thus firmly gripping the inner periphery of workpiece 58 and drawing it firmly against the stop buttons.

We claim:

1. A chuck comprising a body adapted to be mounted on the rotating drive member of a machine tool for rotation about the axis of the drive member, said body having a front face and a rear face, said body having a plurality of circumferentially spaced circular bores therein, said bores being equally spaced from the central axis of the body and each extending along an axis similarly inclined to the central axis of the body, said bores extending through said front face, said body having a coaxial central bore extending forwardly from the rear face thereof and communicating around its outer periphery with the rear end portions of said inclined bores, a jaw carrier rod slideably arranged within each of said bores and rotatable therein about its longitudinal axis, said jaw carrier rods being of circular cross section and having radially facing jaws mounted on the front end portions thereof and fixed relative thereto, the inner ends of said rods projecting into said central bore, a drawbar having a drive portion arranged for axial sliding movement in said central bore and means interconnecting said drive portion of the drawbar with the rear end portions of each rod and permitting limited rotation of each rod about said inclined axes, said interconnecting means engaging each rod such that the force applied to each rod in response to axial reciprocation of the drawbar extends parallel to the axis of the respective inclined bore, said jaw members being adapted to be displaced radially and axially in response to axial reciprocation of the drawbar.

2. A chuck as called for in claim 1 wherein said interconnecting means comprises a radially inwardly extending notch in the rear end portion of each rod, each notch having axially spaced side faces extending perpendicular to the axis of the rod and a plurality of lugs on said drawbar portion each inclined at an acute angle to the axis of the central bore and slideably engaging said notches, said lugs and notches being dimensioned to provide a radial clearance between the outer ends of said lugs and the inner ends of said notches whereby to permit slight rotation of the rods about their longitudinal axes when the jaws are displaced radially to engage a workpiece therebetween.

3. A chuck as called for in claim 1 wherein said interconnecting means comprises a radially inwardly facing notch in the rear end portion of each rod, each of said notches being defined by a pair of axially spaced faces which extend perpendicular to the longitudinal axis of the rod and a plurality of lugs on said driving portion of said drawbar inclined at an acute angle to the axis of said central bore, said lugs each being defined by a pair of faces which are in coplanar sliding engagement with the side faces of said notches, said lugs having a radial extent less than the radial extent of said notches to provide a radial clearance therebetween which enables each rod and the jaw mounted thereon to rotate slightly about the longitudinal axis of the rod when the jaws are displaced radially to engage a workpiece therebetween.

4. A chuck as called for in claim 3 wherein said body includes an integral portion extending forwardly of said front face concentric to the axis of the body, said inclined bores intersecting said front face and said integral extension such that a circumferential portion of each rod at its front end is radially supported by said integral extension, each jaw being mounted on the portion of its rod which is radially opposite the portion supported by said integral extension.

5. A chuck as called for in claim 4 wherein said bores are inclined radially outward in a forward direction and said integral extension extends circumferentially around the radially outer sides of said rods.

6. A chuck comprising a body adapted to be mounted on the rotating drive member of a machine tool for rotation about the axis of the drive member, said body having a front face perpendicular to said axis and against which a workpiece is adapted to be located, said body having a plurality of circumferentially spaced circular bores therein, said bores being equally spaced from the central axis of the body and each extending along an axis similarly inclined to the central axis of the body, said bores extending through said front face, said body having a central bore extending forwardly from the rear face thereof and communicating around its outer periphery with the rear end portions of said inclined bores, a jaw carrier rod slideably arranged within each of said bores, said jaw carrier rods being of circular cross section and having radially facing jaws mounted on the front end portions thereof, the inner ends of said rods projecting into said central bore, a drawbar having a drive portion arranged for axial sliding movement in said central bore and means interconnecting said drive portion of the drawbar with the rear end portions of each rod and permitting limited rotation of each rod about said inclined axes, said jaw members being adapted to be displaced radially and axially in response to axial reciprocation of the drawbar, said interconnecting means comprising a radially inwardly facing notch in the rear end portion of each rod, each of said notches being defined by a pair of axially spaced faces which extend perpendicular to the longitudinal axis of the rod and a plurality of lugs on said driving portion of said drawbar, said lugs each being defined by a pair of faces which are in coplanar sliding engagement with the side faces of said notches, said lugs having a radial extent less than the radial extent of said notches to provide a radial clearance therebetween which enables each rod and the jaw mounted thereon to rotate slightly about the longitudinal axis of the rod when the jaws are displaced radially to engage a workpiece therebetween, said body including an integral portion extending forwardly of said front face concentric to the axis of the body, said inclined bores intersecting said front face and said integral extension such that a circumferential portion of each rod at its front end is radially supported by said integral extension, each jaw being mounted on the portion of its rod which is radially opposite the portion supported by said integral extension, said bores being inclined radially inwardly and said integral extension comprising a boss projecting forwardly from said front face at the axis of the body.

* * * * *